(12) United States Patent
Desinor, Jr.

(10) Patent No.: US 10,249,121 B2
(45) Date of Patent: Apr. 2, 2019

(54) REAL ESTATE WIRELESS LOCKBOX

(71) Applicant: Garcia Desinor, Jr., Dallas, TX (US)

(72) Inventor: Garcia Desinor, Jr., Dallas, TX (US)

(*) Notice: Subject to any disclaimer, the term of this patent is extended or adjusted under 35 U.S.C. 154(b) by 0 days.

(21) Appl. No.: 15/630,293

(22) Filed: Jun. 22, 2017

(65) Prior Publication Data
US 2017/0294064 A1  Oct. 12, 2017

Related U.S. Application Data

(63) Continuation of application No. 14/937,533, filed on Nov. 10, 2015, now Pat. No. 9,704,319.

(60) Provisional application No. 62/096,216, filed on Dec. 23, 2014.

(51) Int. Cl.
  *G07C 9/00* (2006.01)
  *G06Q 50/16* (2012.01)

(52) U.S. Cl.
  CPC ..... *G07C 9/00309* (2013.01); *G07C 9/00896* (2013.01); *G06Q 50/16* (2013.01); *G07C 9/00571* (2013.01); *G07C 2009/00325* (2013.01); *G07C 2009/00769* (2013.01); *G07C 2009/00793* (2013.01); *G07C 2009/00936* (2013.01)

(58) Field of Classification Search
  None
  See application file for complete search history.

(56) References Cited

U.S. PATENT DOCUMENTS

| | | |
|---|---|---|
| 4,594,637 A | 6/1986 | Falk |
| 4,609,780 A | 9/1986 | Clark |
| 4,628,636 A * | 12/1986 | Folger ............... E05F 15/41 49/199 |
| 4,777,556 A | 10/1988 | Imran |
| 4,800,255 A | 1/1989 | Imran |
| 4,851,652 A | 7/1989 | Imran |
| 4,864,115 A | 9/1989 | Imran |
| 4,988,987 A | 1/1991 | Barrett |
| 5,557,888 A | 9/1996 | Ruchat et al. |
| 6,472,973 B1 | 10/2002 | Harold et al. |
| 6,581,332 B1 | 6/2003 | Kim |
| 8,164,419 B2 * | 4/2012 | Fisher ............. E05B 19/0005 340/5.73 |
| 8,373,555 B1 | 2/2013 | Redden et al. |
| 2007/0018787 A1 | 1/2007 | Martinez de Velasco Cortina et al. |
| 2007/0090921 A1 | 4/2007 | Fisher |
| 2008/0103787 A1 * | 5/2008 | Cavanaugh ......... G06F 17/3087 705/347 |

(Continued)

FOREIGN PATENT DOCUMENTS

| | | |
|---|---|---|
| CA | 1222038 | 5/1987 |
| CA | 1274894 | 10/1990 |

*Primary Examiner* — Laura N Nguyen

(74) *Attorney, Agent, or Firm* — Frost Brown Todd LLC

(57) ABSTRACT

A system and method are described regarding a wireless lockbox that can be used to manage real estate sales tours. A system can include various owners and buyers that create a searchable real estate listing. Buyers can review the list via computing device, such as a smartphone, and request home tours. Owners can review requests and approve potential buyers to tour their property. When the potential buyer approaches the property, software on their computing device can communicate via Bluetooth, or another wireless network, and unlock the wireless lockbox.

6 Claims, 19 Drawing Sheets

(56) References Cited

U.S. PATENT DOCUMENTS

| | | | |
|---|---|---|---|
| 2008/0252415 A1 | 10/2008 | Larson et al. | |
| 2009/0153291 A1* | 6/2009 | Larson | E05B 19/0005 |
| | | | 340/5.33 |
| 2009/0167526 A1 | 7/2009 | Graves et al. | |
| 2009/0251280 A1* | 10/2009 | Marchetto | G08C 17/02 |
| | | | 340/5.7 |
| 2011/0053557 A1* | 3/2011 | Despain | A47G 29/10 |
| | | | 455/410 |
| 2012/0068817 A1 | 3/2012 | Fisher | |
| 2012/0126936 A1 | 5/2012 | Harkins et al. | |
| 2012/0297684 A1 | 11/2012 | Bresson et al. | |
| 2013/0009785 A1 | 1/2013 | Finn et al. | |
| 2015/0022315 A1* | 1/2015 | Ng | E05B 19/0005 |
| | | | 340/5.22 |
| 2015/0091696 A1* | 4/2015 | Fisher | G07C 9/00571 |
| | | | 340/5.61 |
| 2015/0360027 A1 | 12/2015 | Bachinski et al. | |
| 2016/0094773 A1* | 3/2016 | Maciuca | H04N 5/23206 |
| | | | 348/207.11 |

* cited by examiner

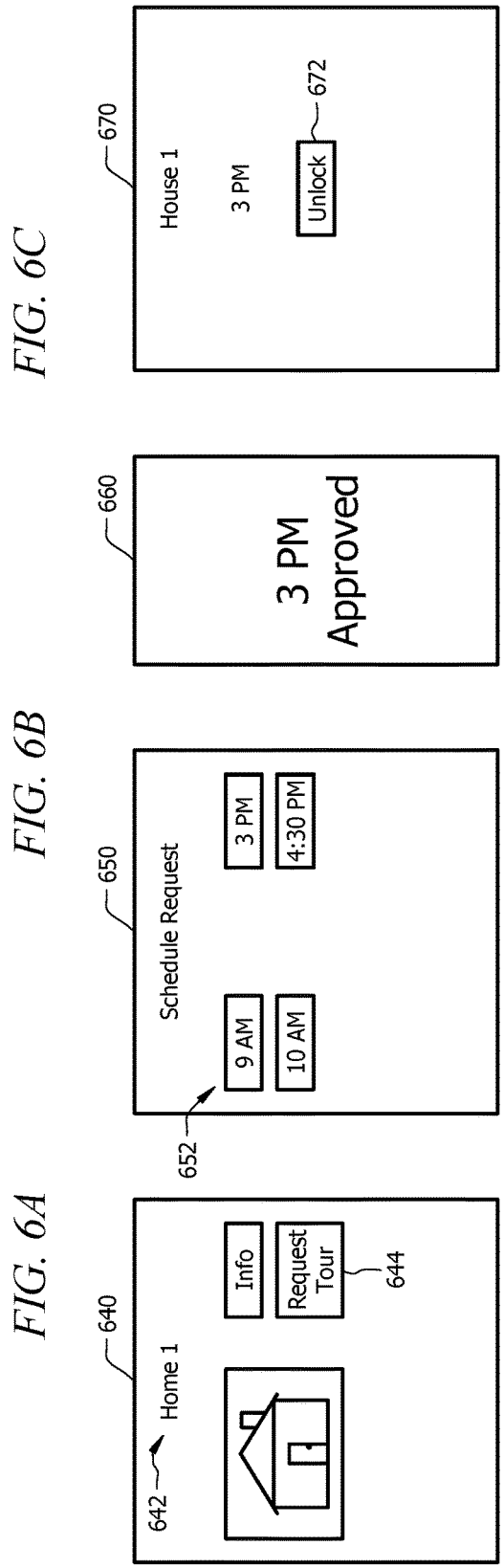

*FIG. 7A*

710
Name: ←712
Information:
Address:

*FIG. 7B*

720
Upload Pictures
722

*FIG. 7C*

730
House Information
Size:
Bedroom:
Bath: ←732

*FIG. 7D*

740
Tour Availability
742

*FIG. 7E*

750
Request
Time: 3:00 PM
User: Adam Smith
756
Approve ←752
Reject ←754

REAL ESTATE WIRELESS LOCKBOX

CROSS REFERENCE TO RELATED INFORMATION

This application is a continuation application of application Ser. No. 14/937,533, filed Nov. 10, 2015, titled "Real Estate Wireless Lockbox", which claims the benefit of U.S. Provisional Patent Application No. 62/096,216, filed Dec. 23, 2014, the contents of which are hereby incorporated herein in its entirety.

TECHNICAL FIELD

The present disclosure is directed to lockboxes for use in real estate sales and by realtors and more particularly to a remotely controllable lockbox.

BACKGROUND OF THE INVENTION

The real estate market is largely dependent on realtors. Realtors offer great services but sometimes buyers or sellers would like to have more flexibility in how they approach the market. For example, if a couple is shopping for a new home they will often contact a realtor. The realtor looks for available homes in the couple's desired location and price range and sets appointments for viewings. The realtor brings great knowledge to the process regarding locations, costs, and other market factors. But the process of setting appointments, and wrestling with the schedules of the people involved can be difficult and time consuming. It would be great to have a tool that could interface buyers and sellers directly, allowing greater flexibility and efficiency in setting appointments and viewings.

Along with creating efficiencies in setting viewings, it would be great to have a tool that interfaces buyers and sellers with regard to real estate listings. It can be difficult for a seller to know how to list his home for sale, how to publish, etc., and buyers may not know where to go to see what homes are for sale. Both sides end up going to realtors and letting them do the listing and/or searching.

The real estate market currently uses lockboxes placed on a door knob or porch of a listed house. These lockboxes contain a key to the house. Often times a code or other unlocking mechanism for the lockbox is known only to licensed realtors. These lockboxes allow a realtor to access and show a house when the owner is unavailable. These lockboxes are helpful but the market could use a lockbox with increased capabilities and availability. For example, users would love to be able to buy their own lockbox and manage it via a wireless connection. Users would love to be able to lock and unlock the lockbox remotely. Users could get a notification that a buyer would like to view the house and the owner could view and approve the visit remotely.

A tool with the capabilities described above would especially be helpful for sellers. Sellers pay the realtors' fees, often six percent (three percent each to the buying and selling realtors). Realtors provide valuable services but some sellers have less financial flexibility. Tools allowing home owners to sell independently would be very helpful.

BRIEF SUMMARY OF THE INVENTION

One embodiment of the present disclosure comprises a system for managing wireless lockboxes comprising: a plurality of wireless lockboxes, the plurality of wireless lockboxes comprising a first Bluetooth interface, a cellular interface, a lockable tray operable to store a key, a microprocessor, and a power supply, wherein the microprocessor is operable to lock and unlock the lockable tray; and a plurality of mobile devices, the plurality of mobile devices comprising a second Bluetooth interface, wherein the second Bluetooth interface is operable to communicate with the first Bluetooth interface to unlock the lockable tray.

Another embodiment comprises a wireless lockbox comprising: a Bluetooth interface, the Bluetooth interface operable to communicate with a plurality of mobile devices; a cellular interface, the cellular interface operable to communicate with a plurality of servers; a lockable tray, the lockable tray operable to hold a house key; and a microprocessor, the microprocessor coupled to the Bluetooth interface, the cellular interface, and the lockable tray, the microprocessor operable to unlock the lockable tray upon receiving an unlock command from one of the plurality of mobile devices over the Bluetooth interface, wherein the unlock command is received during a predetermined time period and if the unlock command is received outside the predetermined time period then the microprocessor does not unlock the lockable tray.

Another embodiment comprises a method of managing a wireless lockbox comprising: receiving an identification number for a wireless lockbox; receiving account information for a home owner using the wireless lockbox; associating the account information with the identification number; receiving a request to view the property of the home owner during a time period from a requesting mobile device; notifying the home owner of the request; receiving approval from the home owner; and sending an unlock code to the requesting mobile device; wherein the unlock code allows the requesting mobile device to open the wireless lockbox by means of Bluetooth communication during the time period.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 6A-6G are diagrams of user interface embodiments under the present disclosure.

FIGS. 7A-7E are diagrams of user interface embodiments under the present disclosure.

DETAILED DESCRIPTION OF THE INVENTION

The present disclosure describes a wirelessly connected real estate lockbox. Such a wireless lockbox will be of great value in the real estate market and for use by home owners and realtors. The wireless lockbox can be placed at the door of a house or apartment being sold. A buyer or realtor, desiring to tour the house or apartment, may unlock the wireless lockbox via a wireless signal such as Bluetooth. The property owner may also control the wireless lockbox remotely via a wireless signal such as cellular. The various users may all interact with the wireless lockbox via an application on a mobile device such as a smartphone or tablet. The system and method described herein allow property owners greater control over the sale of their property. The teachings disclosed herein allow an owner to set schedules, lock, unlock and perform other lockbox operations from a remote location.

Figure 1A:
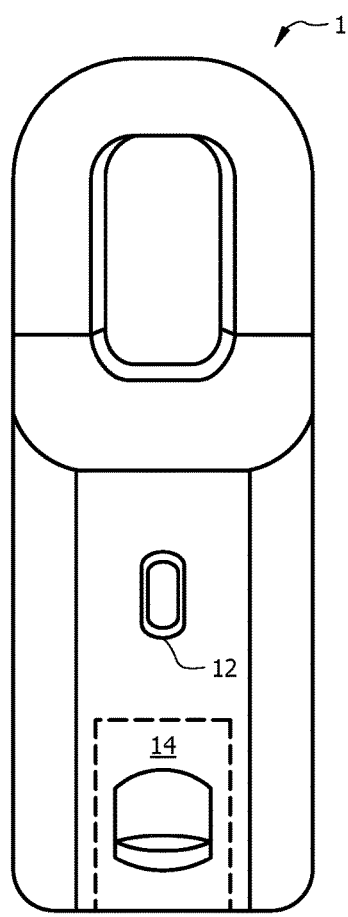
FIGS. 1A-1C are diagrams of prior art embodiments of lockboxes.
Figure 1B:
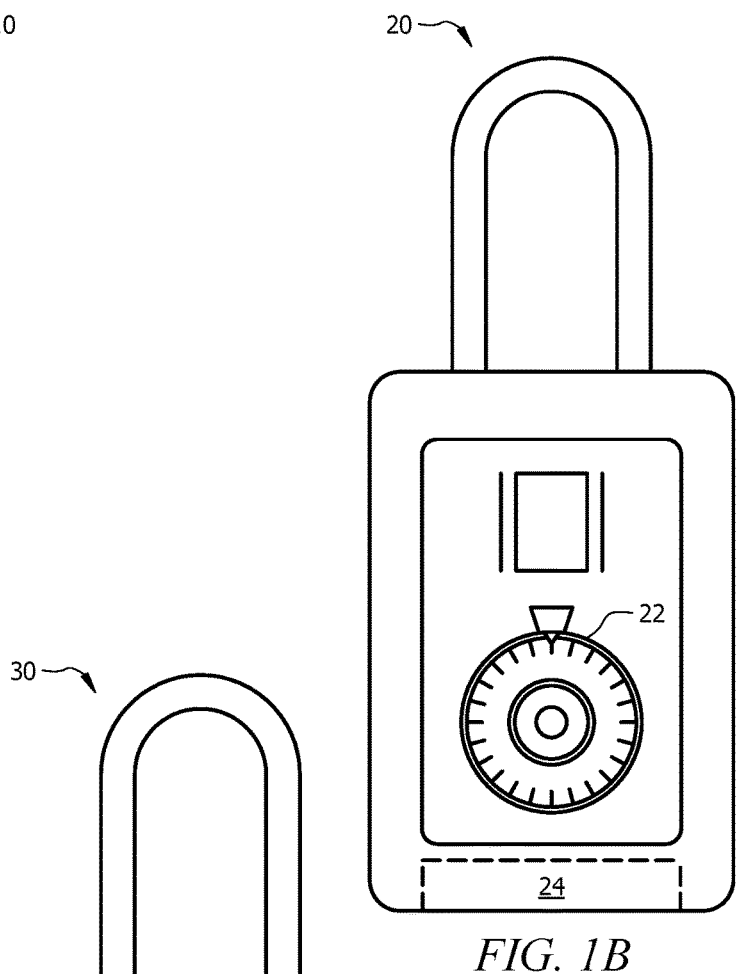
Figure 1C:
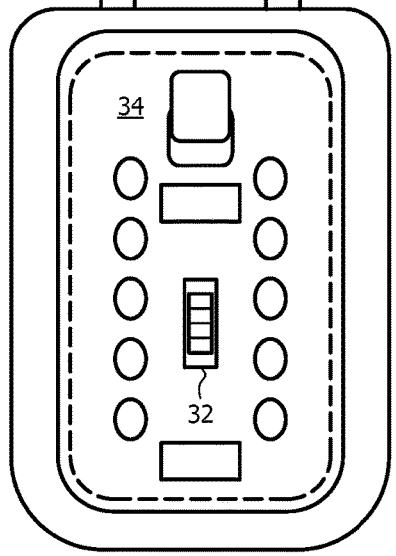

FIGS. 1A-1C display several prior art lockboxes. Lockbox 10 features an infrared sensor 12. When the sensor 12 receives a proper unlock signal the lockbox unlocks partition 14 that contains a key. Lockbox 20 features a combination lock 22 that can release partition 24. Lockbox 30 features keys 32 that, when a proper code is entered, unlocks partition 34 and a key inside.

Figure 2:
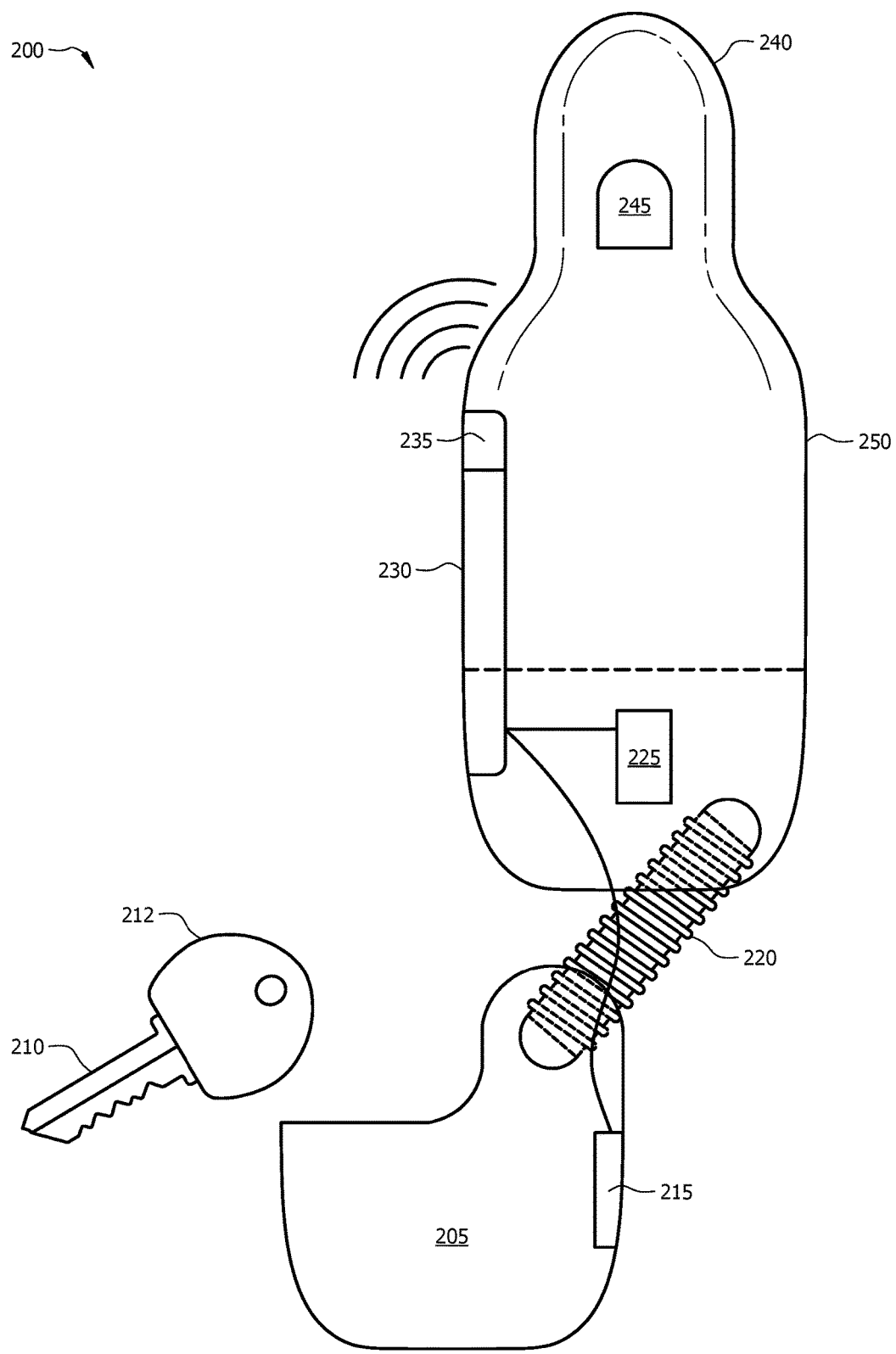
FIG. 2 is a diagram of an embodiment of the present disclosure.
Figure 3B:
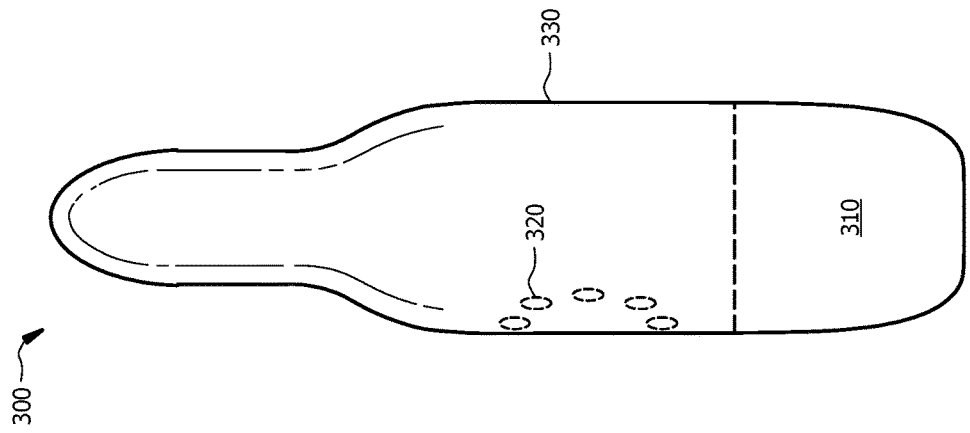
FIGS. 3A-3B are diagrams of a front and side view of an embodiment of the present disclosure.
Figure 3A:
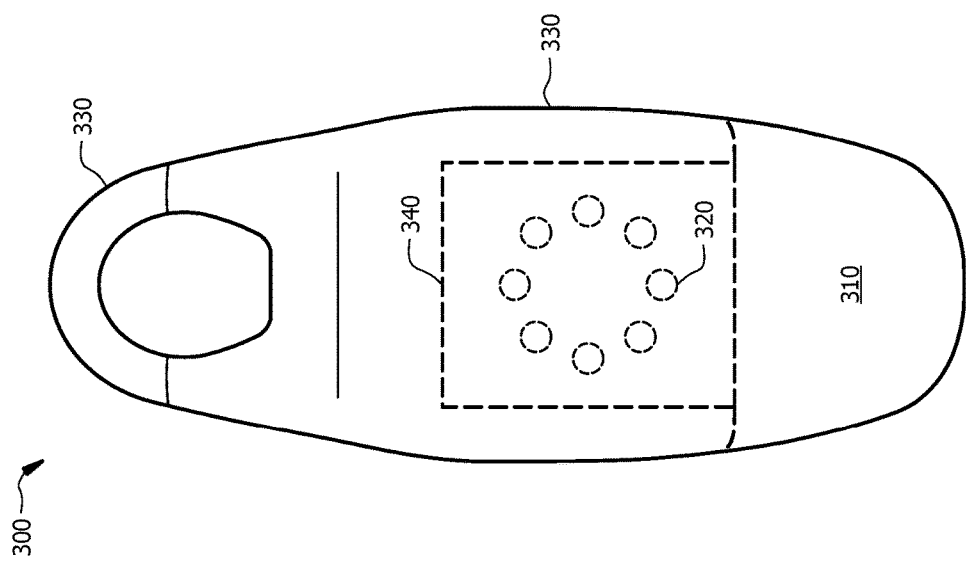

FIG. 2 displays an embodiment of a wireless lockbox under the present disclosure. Wireless lockbox 200 features main body 250 and tray 205. Circuit board 230 comprises a microprocessor that controls wireless lockbox 200. In this embodiment, tray 205 is deployed from main body 250 by means of a rotating screw 220 that is being turned in clockwise and counterclockwise directions by a motor 225 (other embodiments can comprise different deployment mechanisms). Sensor 215 can detect when key 210 (comprising an electronic chip 212) is located within the tray 205. In a preferred embodiment sensor 215 comprises an RFID sensor. Circuit board 230 comprises connections to sensor 215 and motor 225. The circuit board also comprises a wireless interface 235. In a preferred embodiment, the wireless lockbox 200 will comprise both a Bluetooth interface and a cellular interface. Solenoid latch 245 can unlock the arm 240. Arm 240 can allow the wireless lockbox 200 to be placed on a door knob or locked to another location on a house. FIGS. 3A and 3B show views of the wireless lockbox 200 of FIG. 2. Wireless lockboxes 300 are in a closed position. Tray 310 can house a key. LED lights 320 can be used to indicate power, locking, unlocking or other actions. Circuit board 340 can comprise the microprocessor, wireless interfaces, power supply and other features of the wireless lockbox. Arm 330 can allow the wireless lockbox 300 to attach to a door knob.

FIG. 2 shows an embodiment of the security key 210 of the invention. Key 210 comprises a serrated portion and an electronic chip or transmitter portion 212. Chip 212 can be integrated into key 210 or be an add-on. Chip 212 can comprise a wireless transmitter and/or receiver allowing the wireless lockbox 200 to determine the proximity of key 210. When key 210 moves beyond a chosen distance from wireless lockbox 200, such as 100 yards, an alarm or notification is sent to the owner. The chip 212 can utilize Bluetooth, RFID, Wi-Fi or another wireless technology.

Figure 4:
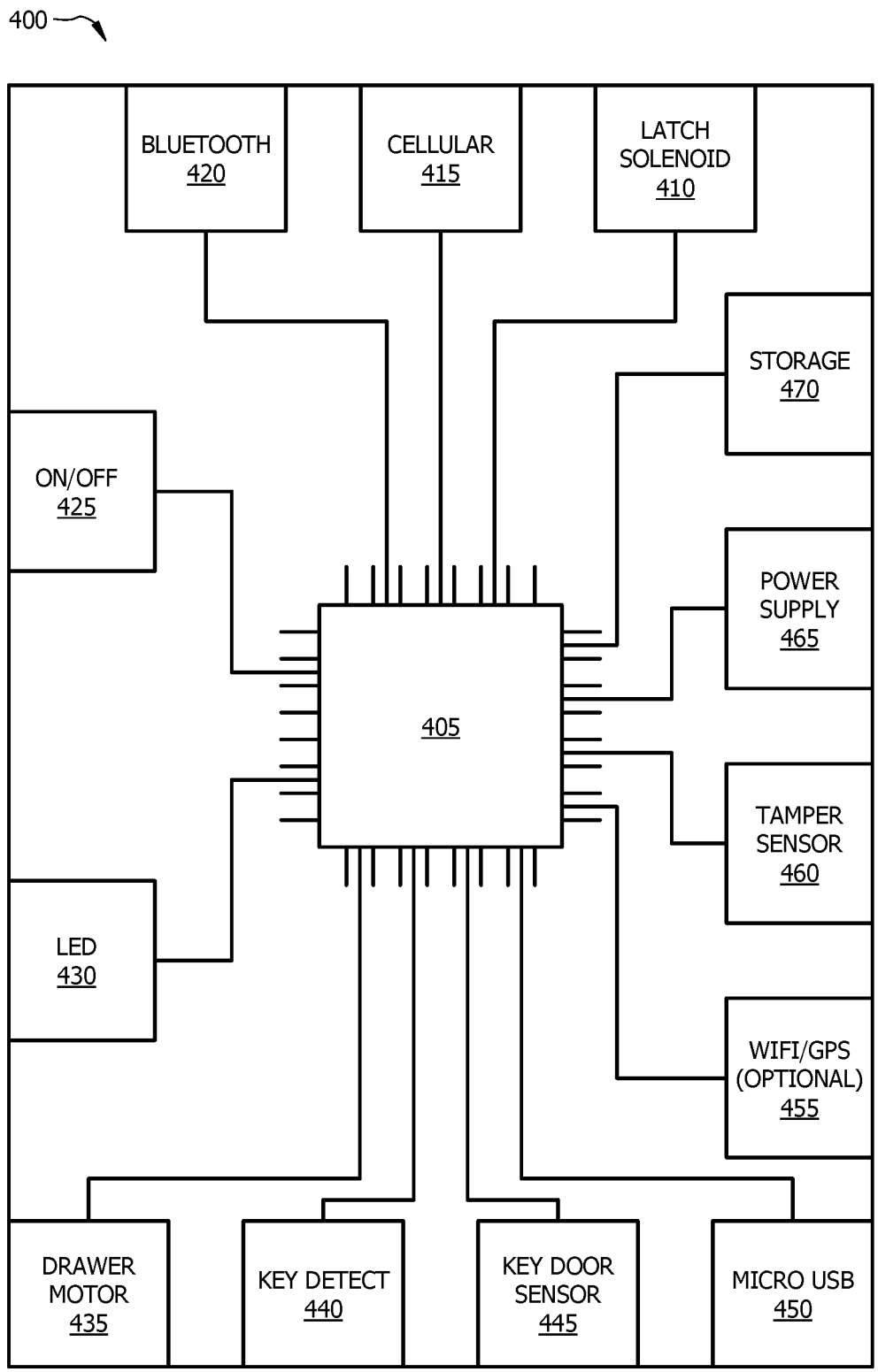
FIG. 4 is a diagram of a circuit board embodiment under the present disclosure.

FIG. 4 displays an embodiment of a circuit board such as board 230 of FIG. 2 or board 340 of FIG. 3A. Board 400 comprises a microprocessor 405. Processor 405 can comprise connections to various hardware and/or software components, such as those displayed. Latch solenoid 410 opens and locks the arm for attachment to a door knob. A preferred embodiment comprises a solenoid latch, but other embodiments can comprise different locking or attaching mechanisms. Some embodiments may not comprise an arm. Cellular interface 415 provides a connection to a cellular network. Interface 415 may comprise any necessary software, antennas or other hardware/software necessary for communicating over a cellular communication network. The network may be 3G, 4G, Wimax, or any appropriate network protocol. Bluetooth interface 420 provides a connection via Bluetooth. Interface 420 can comprise any necessary software, antenna or hardware necessary to communicate via Bluetooth. On/off switch 425 allows users to power on and off the wireless lockbox. LEDs 430 comprise a group of LED lights, in a preferred embodiment, on the front of the wireless lockbox. Other embodiments may eschew LED lights for different types of lights or screens to notify the user of various settings or allow interaction with the user. Drawer motor 435 can comprise a motor or actuator that opens the drawer/tray where the key is stored. Various embodiments can comprise a magnetic attachment, solenoid latch, or other electrical, mechanical, or magnetic connection between the drawer/tray and the main body of the wireless lockbox. Key detect 440 comprises, in a preferred embodiment, an RFID sensor that can detect an RFID chip on the key. Other embodiments can comprise different methods and systems for detecting the key. Magnetic, electric, or other types of sensors may be used. Key door sensor 445 detects when the drawer is closed so as to stop the motor 435. Micro USB 450 provides a means for charging the wireless lockbox and/or updating software. Other embodiments can comprise a different type of charging or computer interface. For example, USB may be used or other connections well known in the telecommunications and consumer electronics markets. Tamper sensor 460 can comprise a sensor to detect when the wireless lockbox is being tampered with. Tamper sensor 460 can comprise a temperature sensor, pressure sensor, accelerometer or other type of tamper sensor. Power supply 465 provides a power supply to the wireless lockbox. Power supply 465 can comprise various types of batteries such as lithium-ion, solar panel, or other type/combination of power supply. Storage 470 provides storage space and/or memory for use by the microprocessor. Storage 470 can store operating instructions, data and other needed information. Circuit board can comprise optional Wi-Fi or GPS interfaces 455. A Wi-Fi interface can provide a connection to a local wireless internet network. A GPS can provide reception to a GPS satellite.

Figure 5:
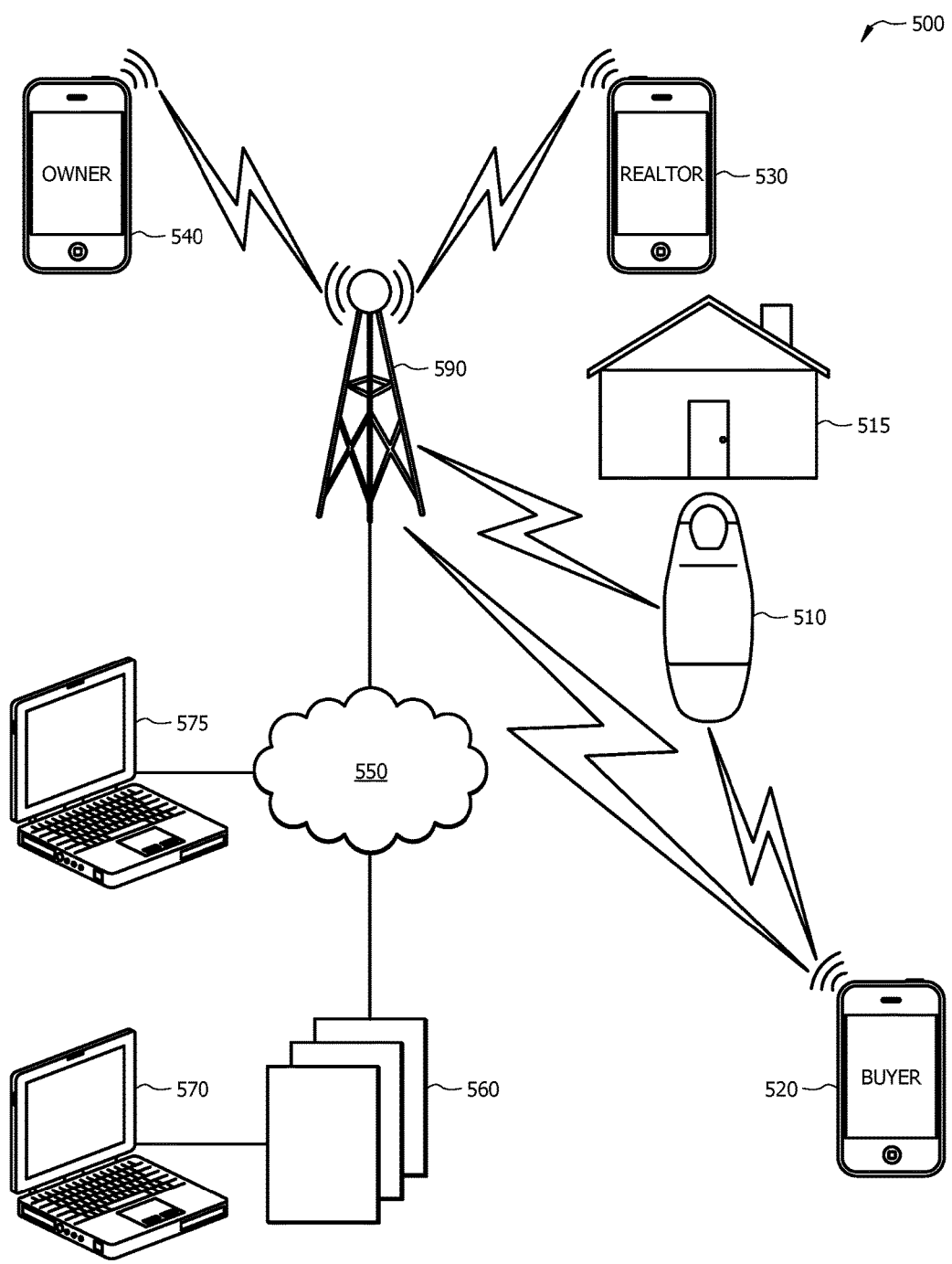
FIG. 5 is a diagram of a system embodiment under the present disclosure.

FIG. 5 displays a system 500 making use of the teachings of the present disclosure. Wireless lockbox 510 is located at house 515, either attached to a door knob or otherwise placed at the house 515. Wireless lockbox 510 comprises both a Bluetooth and a cellular connection. Cellular network 590 allows the wireless lockbox 510 to communicate with the owner's device 540 and realtor's device 530. If buyer 520 is approved to tour the home 515, then buyer 520 will receive a code that buyer's device 520 can send to wireless lockbox 510 via Bluetooth, thereby opening the wireless lockbox 510 and obtaining the key to home 515. Devices 520, 530 and 540 can all run an application that manages communications between the devices and sets a showing schedule for home 515. The schedule can be approved by owner 540. In some embodiments a realtor can be in charge of unlocking the wireless lockbox 510. Servers 560 can store schedules, users IDs, home information, seller listings, and more. This data can be available to users 520, 530, 540 via network 550 and cellular network 590. Computer 570 can comprise an interface for servers 560. Computer 575 can comprise a user's computer (buyer, realtor, or owner) that can access servers 560 via network 550 and interact with components of the system via network 550 and cellular network 590.

FIGS. 6A-6G display embodiments of a typical interface and process for a user to create a profile and set up a home tour using the present disclosure. Interfaces 610-670 can comprise interfaces for a smartphone or other device. In FIG. 6A, a user can input personal information 612 (that can include various types of data) to create a profile. In FIG. 6B, a user, after searching for a specific zip code, or using a location determination system within a computing device, can see listings 622 of home or other properties for sale. Results of a search can also be displayed in a map view 632. After selecting a specific property the user can see specific details 642, such as in interface 640. The user can also be presented with a command/button 644 to request a tour of the property. The user can then be presented with available times for a tour 652. The user can select a time. When the owner accepts the time the user will be notified that their tour has been approved 660. When the user arrives at the house at the appointed time the application will provide a command that instructs the lockbox to open, via Bluetooth 672.

FIGS. 7A-7E display embodiments 710-750 of interfaces and processes that a property owner may use when using the present disclosure's teachings. First an owner may need to create a profile by entering information such as name, address, etc. 712. An owner may also be able to upload pictures of the property 722. The owner can also enter information about the property 732, such as size, bedroom number, bathroom number, and more. The owner can also enter the property's availability for a tour 742. When a potential buyer requests a tour, the owner may receive the request 756 and be able to either accept 752 or reject 754 the request.

FIGS. 8A-8E shows embodiments of interfaces for logging in and using an account according to the present disclosure. Interface 810 shows a login page 812 by which users log in to an account. Interface 820 shows an account creation page 822 for new users. Interface 830 shows a user's home page 832 upon being logged in to the application. The home screen 832 can show options for accessing a home search 834, appointment list 836, My Toor 838, edit profile 831, property list 833, and an option to broadcast location 839. The home search 834 would mostly be used by users looking to possibly buy a home. Owners/realtors wishing to do market research may also use it. Property list 833 might mostly be used by realtors and owners to manage their various properties. Edit profile option 831 allows users to edit their information. An option to broadcast location 839 might mostly be used by realtors who want to advertise their location for clients, or turn such functionality off when desired, such as during a meeting. My Toor 838 provides access to an interface for managing a user's wireless lockboxes. A given user may be managing a plurality of wireless lockboxes. If a user selects edit profile 831 then an interface such as interface 842 may be displayed, allowing a user to edit a plurality of different areas. If a user selects property list 833 then an interface such as interface 852 may be displayed. Interface 852 may display a plurality of properties that the user is selling or managing.

Figure 8C:
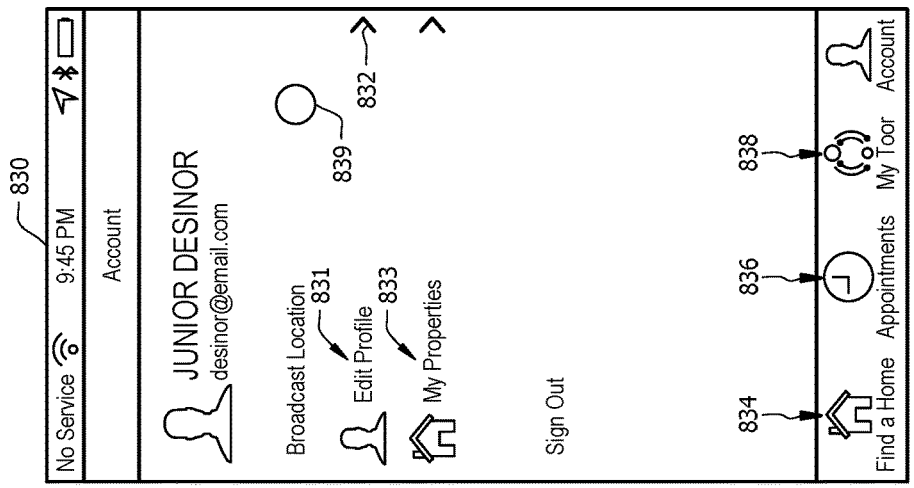
FIGS. 8A-8E are diagrams of user interface embodiments under the present disclosure.
Figure 8B:
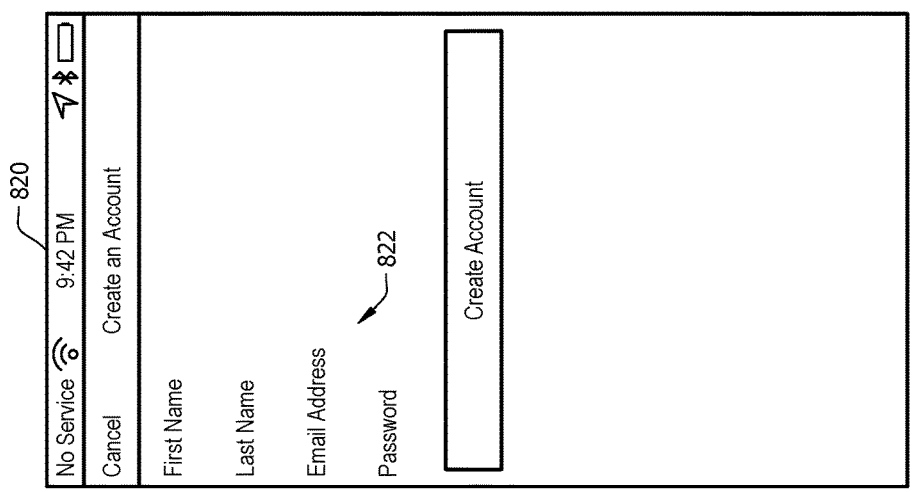
Figure 8A:
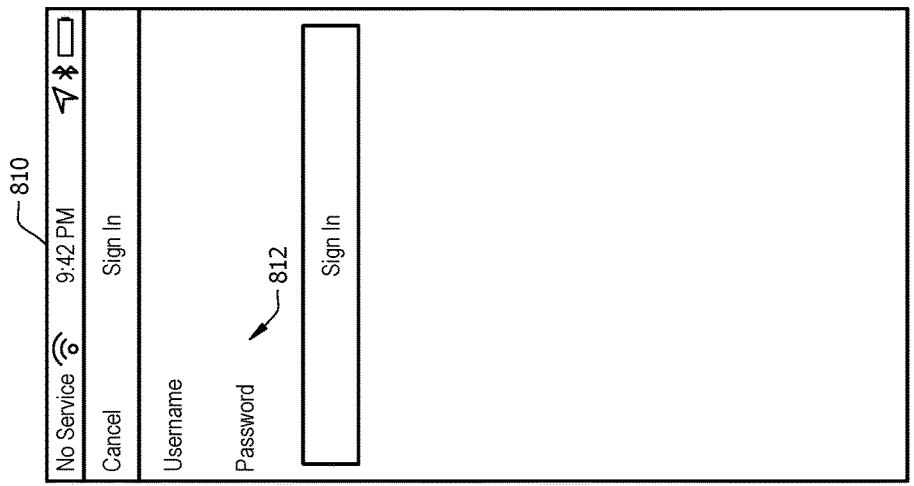
Figure 9A:
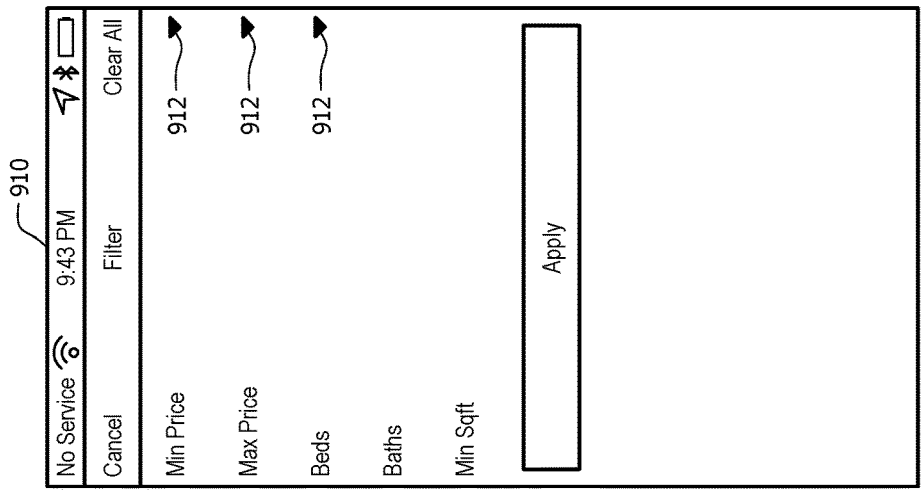
FIGS. 9A-9C are diagrams of user interface embodiments under the present disclosure.
Figure 8E:
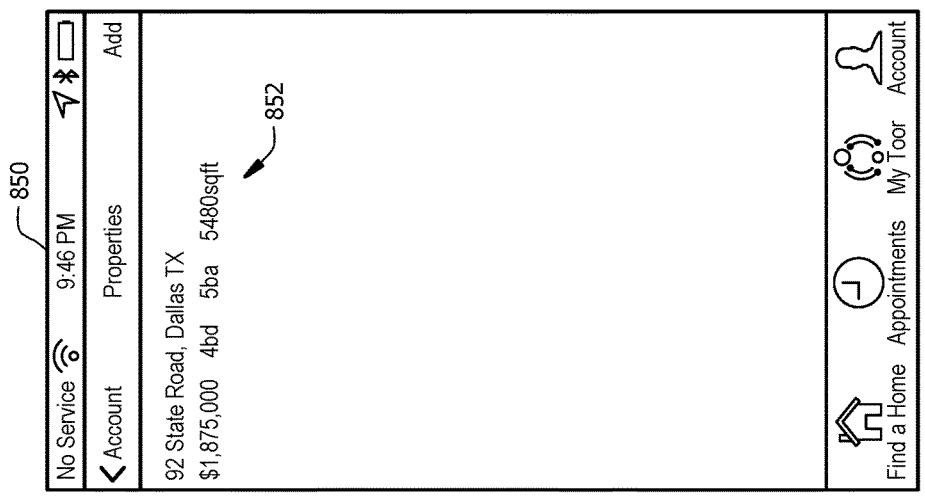
Figure 8D:
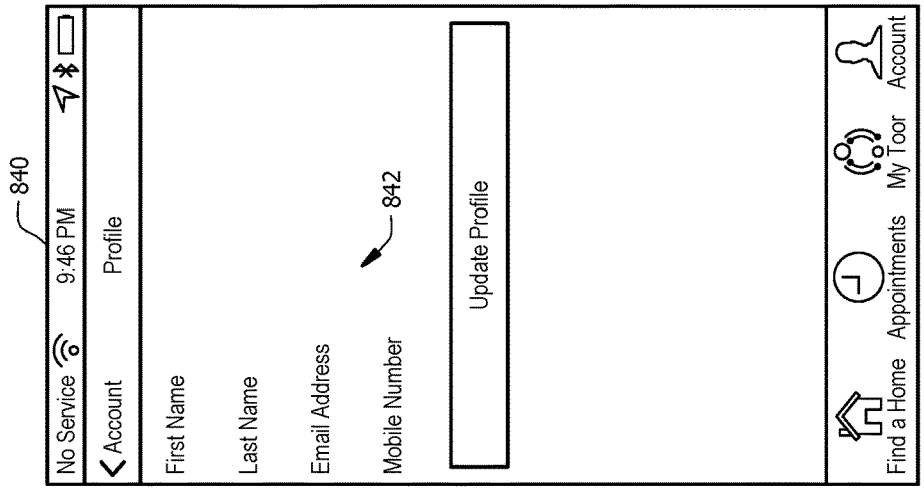
Figure 10A:
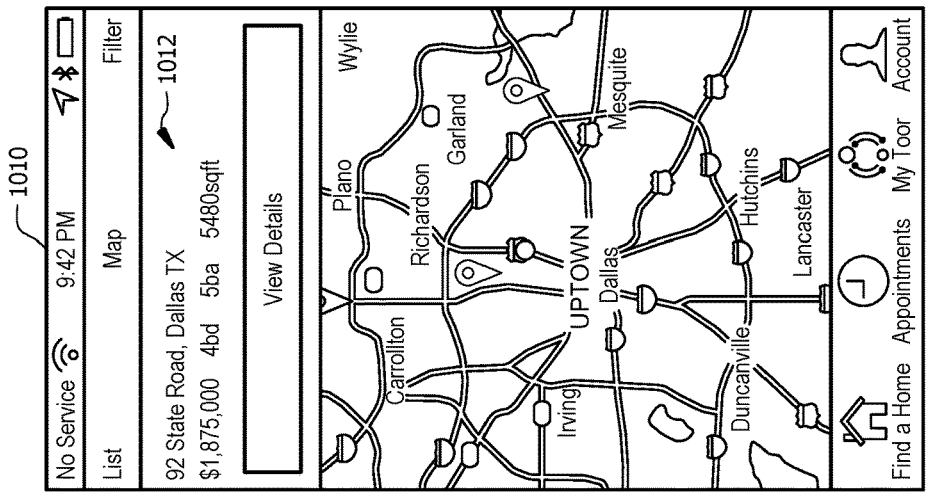
FIGS. 10A-10E are diagrams of user interface embodiments under the present disclosure.
Figure 9C:
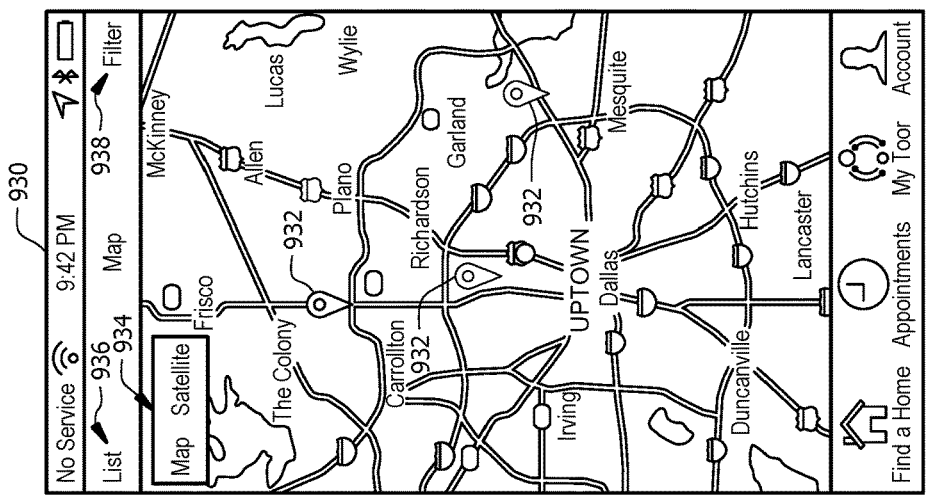
Figure 9B:
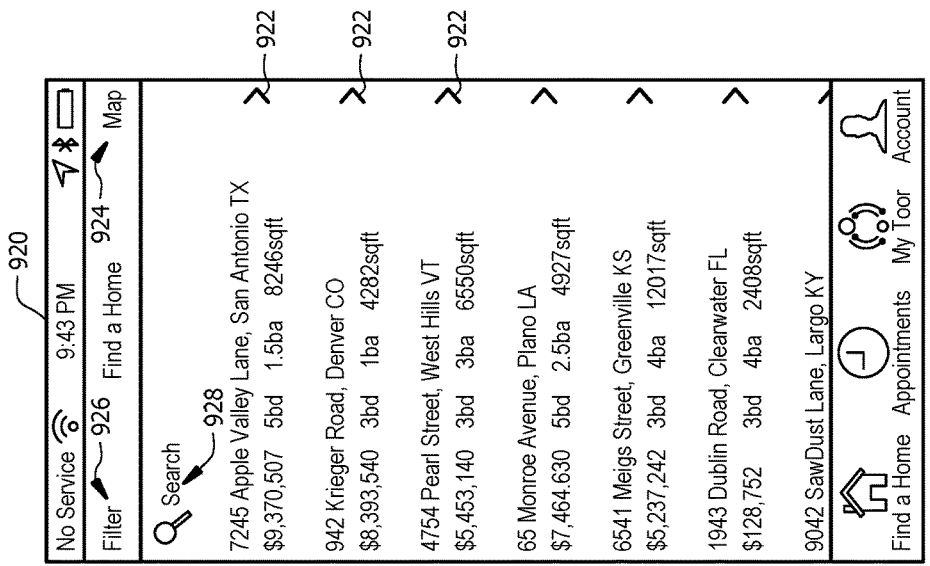
Figure 10D:
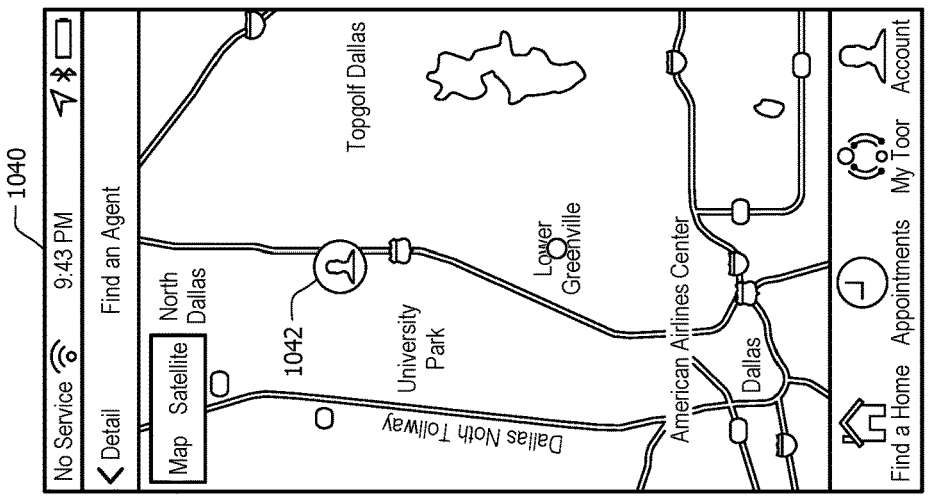
Figure 10C:
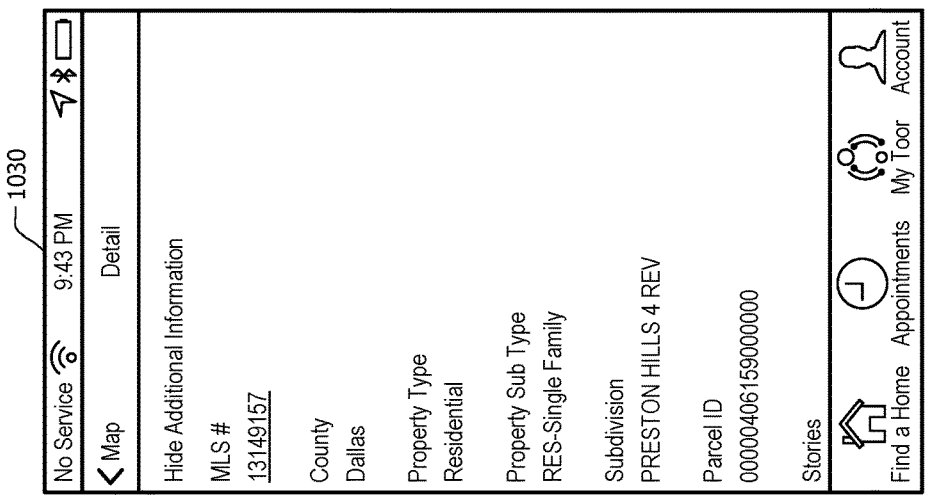
Figure 10B:
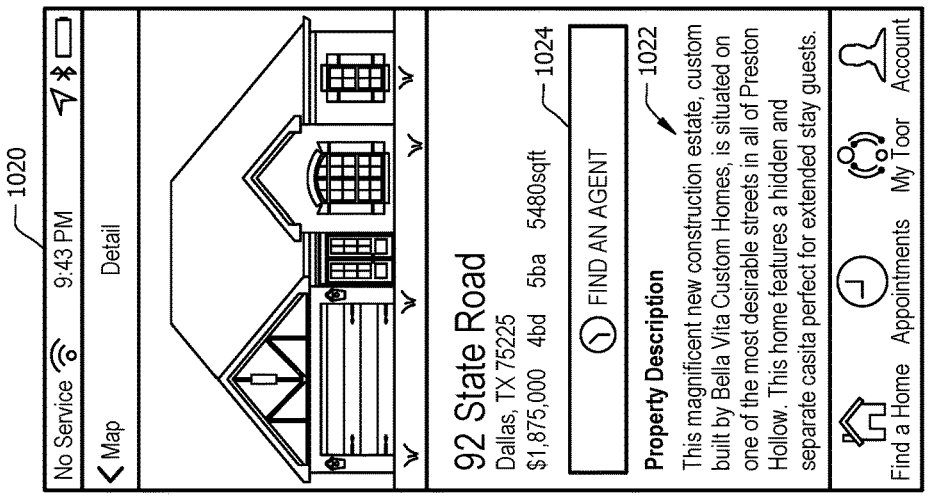

FIGS. 9A-9C display embodiments of interfaces for home searching such as when selecting the home search option 834 of FIG. 8C. FIG. 9A displays a possible embodiment of a filter interface 910. Using this interface a user can select various criteria 912 such as minimum price, maximum price, beds, bathrooms, and more. FIG. 9B shows a results list interface 920 once a user has searched for various criteria. Interface 920 can display a plurality of search results 922. Search bar 928 allows the user to search among the results, such as for a street name or city. Filter option 926 returns the user to the filter page 910 or allows the user to further filter the results with additional filtering options. Map option 924 allows the user to see a map view of the search results. FIG. 9C displays a map interface 930 such as when a user selects option 924 in FIG. 9B. Map interface 930 displays search results 932 and options such as switching between map/satellite view 934. List option 936 returns the user to a list interface 920. Filter option 938 returns the user to the filter page 910 or allows the user to further filter the results with additional filtering options.

FIGS. 10A-10E display embodiments of interfaces for selecting a specific house and for interacting with a map view, such as map interface 930. Property interface 1010 display a property that's been selected from map view 930 or list view 920. Interface 1010 can show an option 1012 to see further details of a specific property. After making a selection of option 1012 the user may be able to see detail interface 1020. Detail interface 1020 can show further details or description 1022. A user can scroll down to see extra information interface 1030. A owner/seller may require that buyers tour a property with a real estate agent. Interface 1020 can provide a find an agent option 1024. After agent selection 1024 is made a user may see agent locator interface 1040. Agent interface 1040 may display agents in a given locality who have made themselves available for services. In this embodiment a real estate agent 1042 is shown. When a user selects agent 1042 the application can display agent interface 1050. Agent interface 1050 can show time or appointment details 1052 and an option to request the agent's escort 1054 at the property.

Figure 11B:
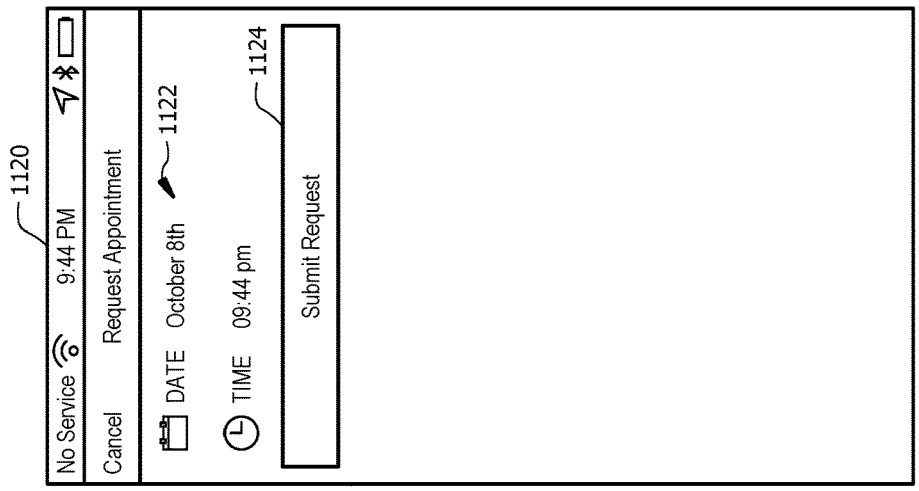
FIGS. 11A-11B are diagrams of user interface embodiments under the present disclosure.
Figure 11A:
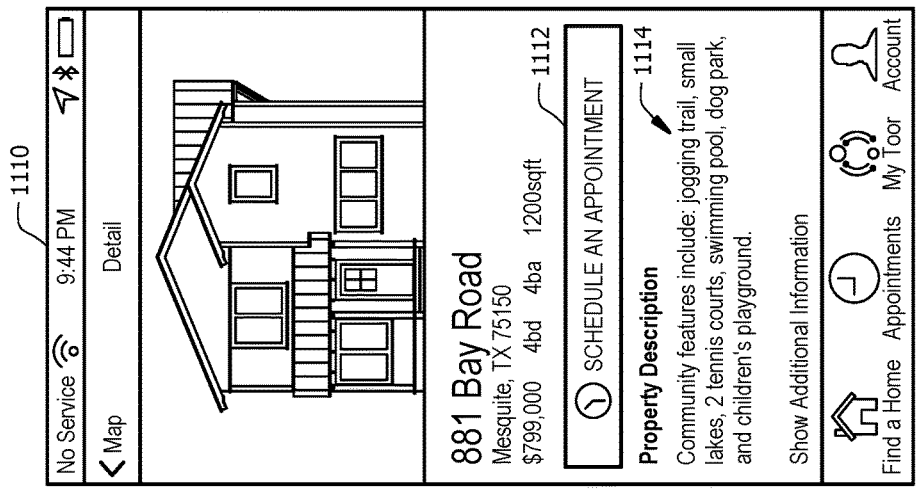
Figure 10E:
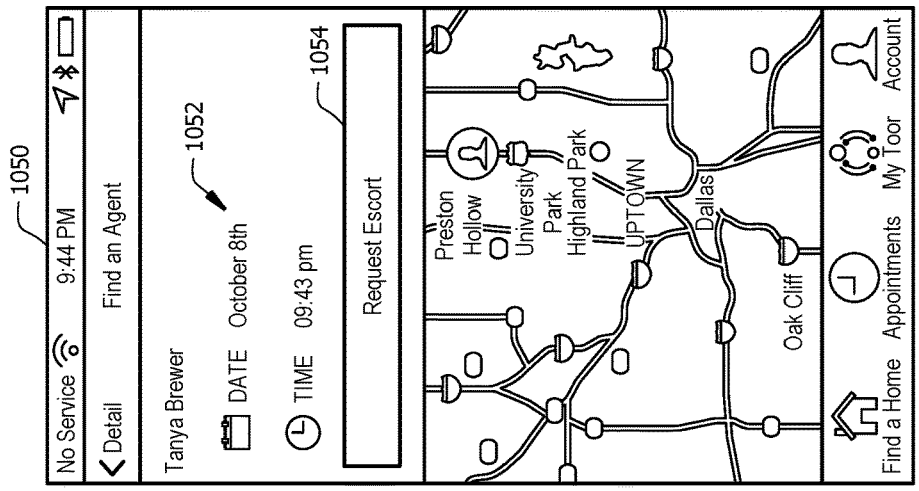

FIGS. 11A-11B show alternative embodiments of detail interfaces for viewing details of a property and scheduling a tour or appointment. Detail interface 1110 can be viewed after selecting a specific property from a list view 920 or map view 930, 1010. Detail interface 1110 can be an alternative to detail interface 1020. Detail interface 1110 shows details 1114 about a selected property and also provides a button or other selection mechanism to schedule an appointment 1112. Upon selecting to schedule an appointment 1112 the user may be presented with appointment interface 1120. The user may be able to edit the time/date 1122 and then submit the request 1124. The request will be sent to the property owner for approval.

Figure 12C:
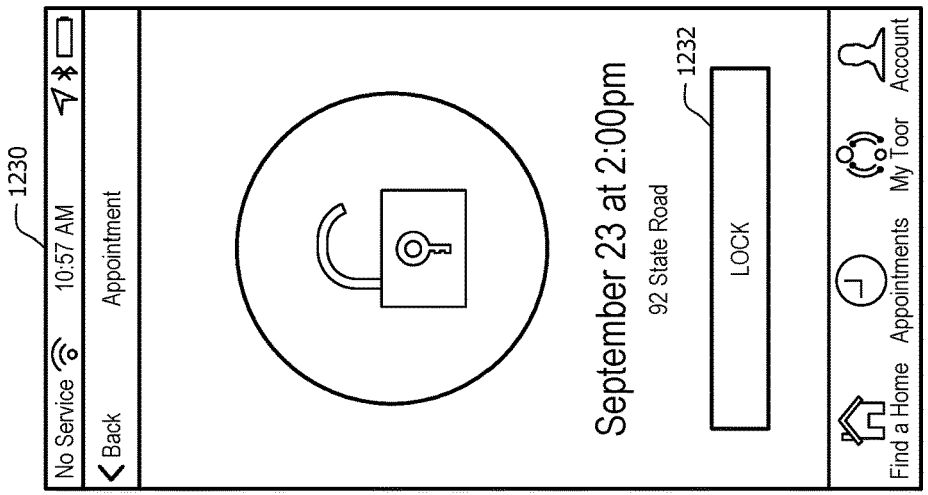
FIGS. 12A-12C are diagrams of user interface embodiments under the present disclosure.
Figure 12B:
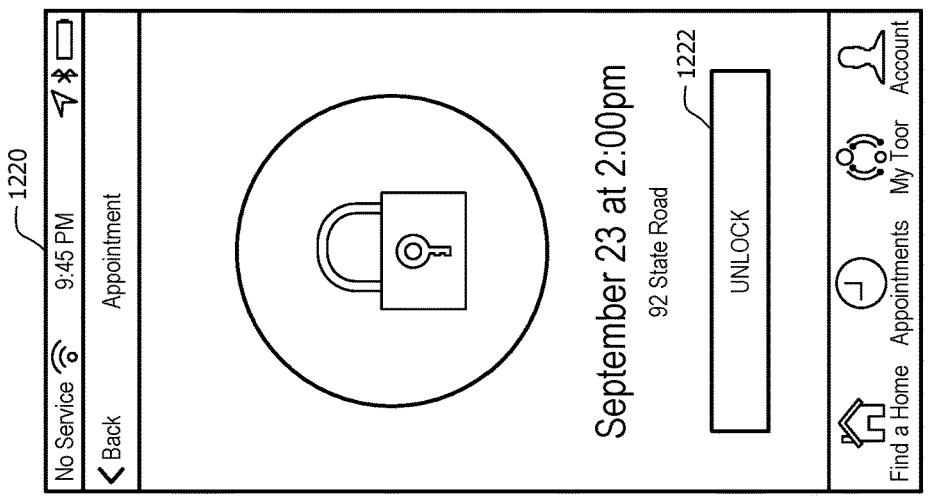
Figure 12A:
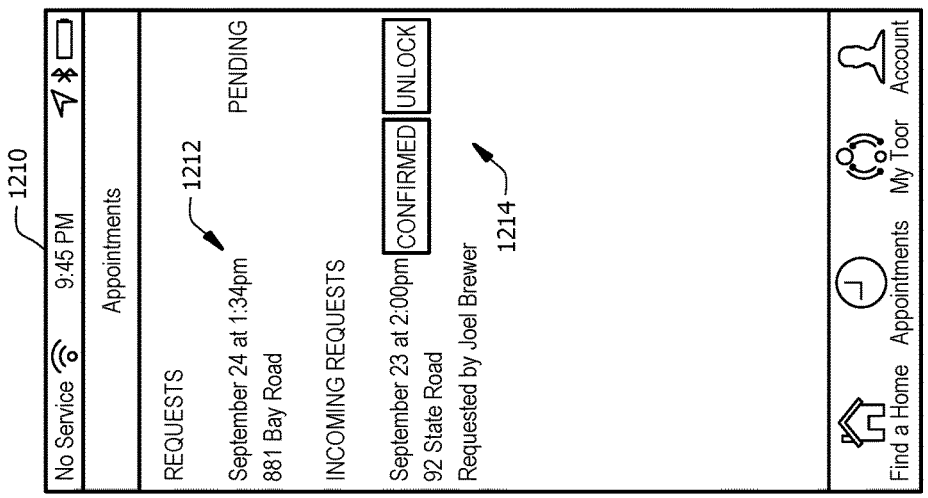

FIGS. 12A-12C display possible embodiments of application interfaces by which an owner can receive and manage appointment requests. In some situations, these interfaces may be used by realtors who are managing a sale of a property. After a potential buyer submits an appointment request 1124, the owner may view that request in appointment interface 1210, such as pending request 1212. Already approved requests 1214 can also be displayed. The owner can click on the pending request and perform different functions such as accepting the request, denying the request, proposing another time, or other actions. Already approved requests 1214 can display an unlock command so that the owner can unlock the wireless lockbox at will. By clicking on a request, a user may also be able to view an unlock interface 1220 or 1230. Unlock interfaces 1220 and 1230 can provide the owner with the ability to either unlock 1222 or lock 1232 the wireless lockbox at the property.

Figure 13C:
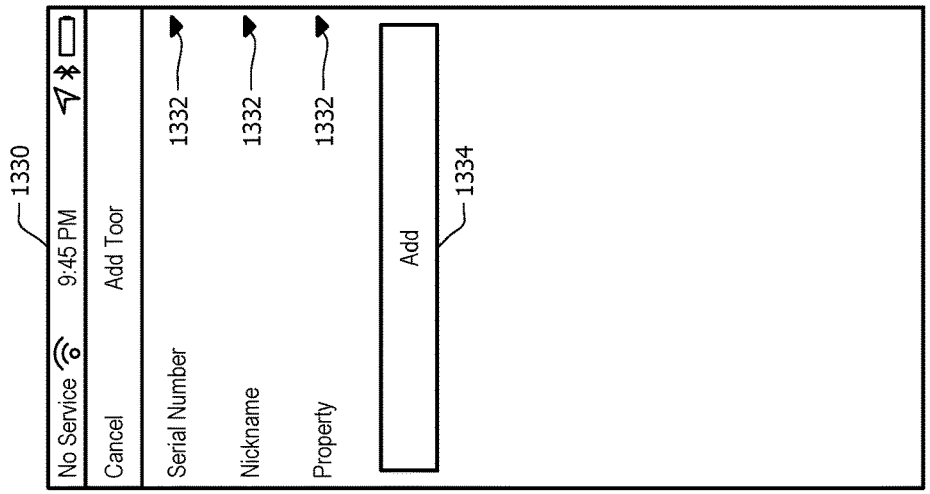
FIGS. 13A-13C are diagrams of user interface embodiments under the present disclosure.
Figure 13B:
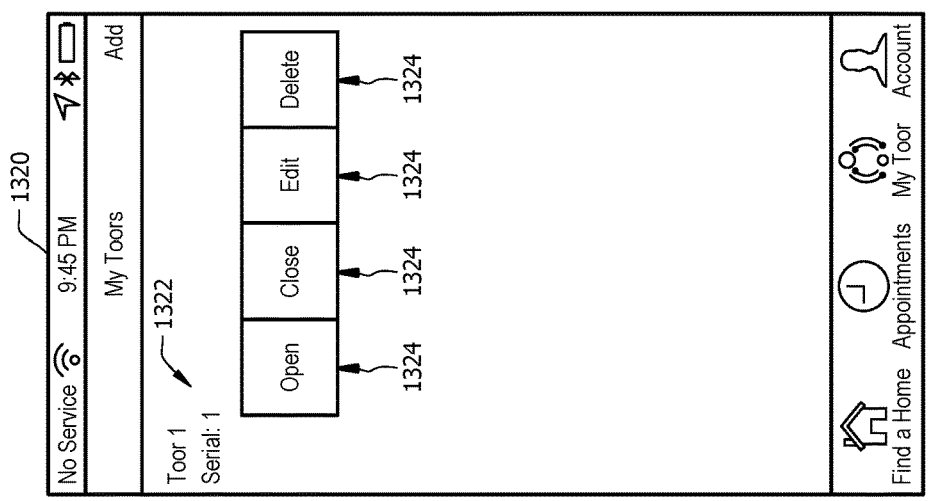
Figure 13A:
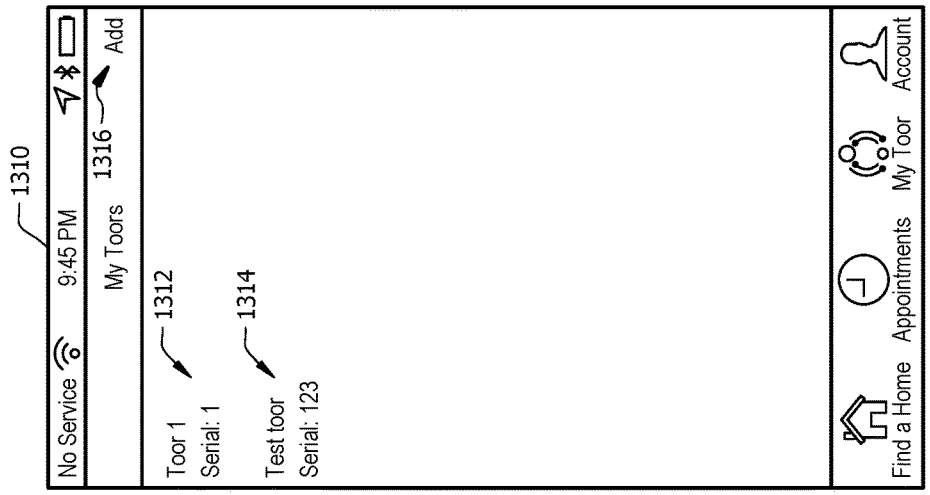

If a user selects My Tour 838, such as from account interface 830 in FIG. 8C, the user can be presented with an embodiment of a My Tour interface 1310 such as in FIGS. 13A-13C. In My Tour interface 1310 a user can view records 1312, 1314 reflecting all of the user wireless lockboxes. Some of the wireless lockboxes can be in use such as 1312. Other wireless lockboxes may be test units 1314. The user can be presented with an option to add a wireless lockbox 1316. Clicking/selecting a wireless lockbox such as 1312 can bring the user to a wireless lockbox interface 1320 where the particular wireless lockbox 1322 can be managed. The user can be presented with a variety of options 1324 to manage the wireless lockbox 1322, such as open, close, edit, and delete. If a user selects to add a wireless lockbox 1316, the user can be presented with adding interface 1330. The user can enter wireless lockbox information 1332 and then add 1334 the wireless lockbox to their account. Once a wireless lockbox is added to the user's account, the user can then manage the wireless lockbox remotely. Servers such as servers 560 in FIG. 5 will associate the user's account with the user's particular wireless lockboxes and allow the user to log in to their account via mobile devices or computers, and control the wireless lockbox via a wireless network, such as cellular (or in alternative embodiments via Wi-Fi or another network).

Figure 14:
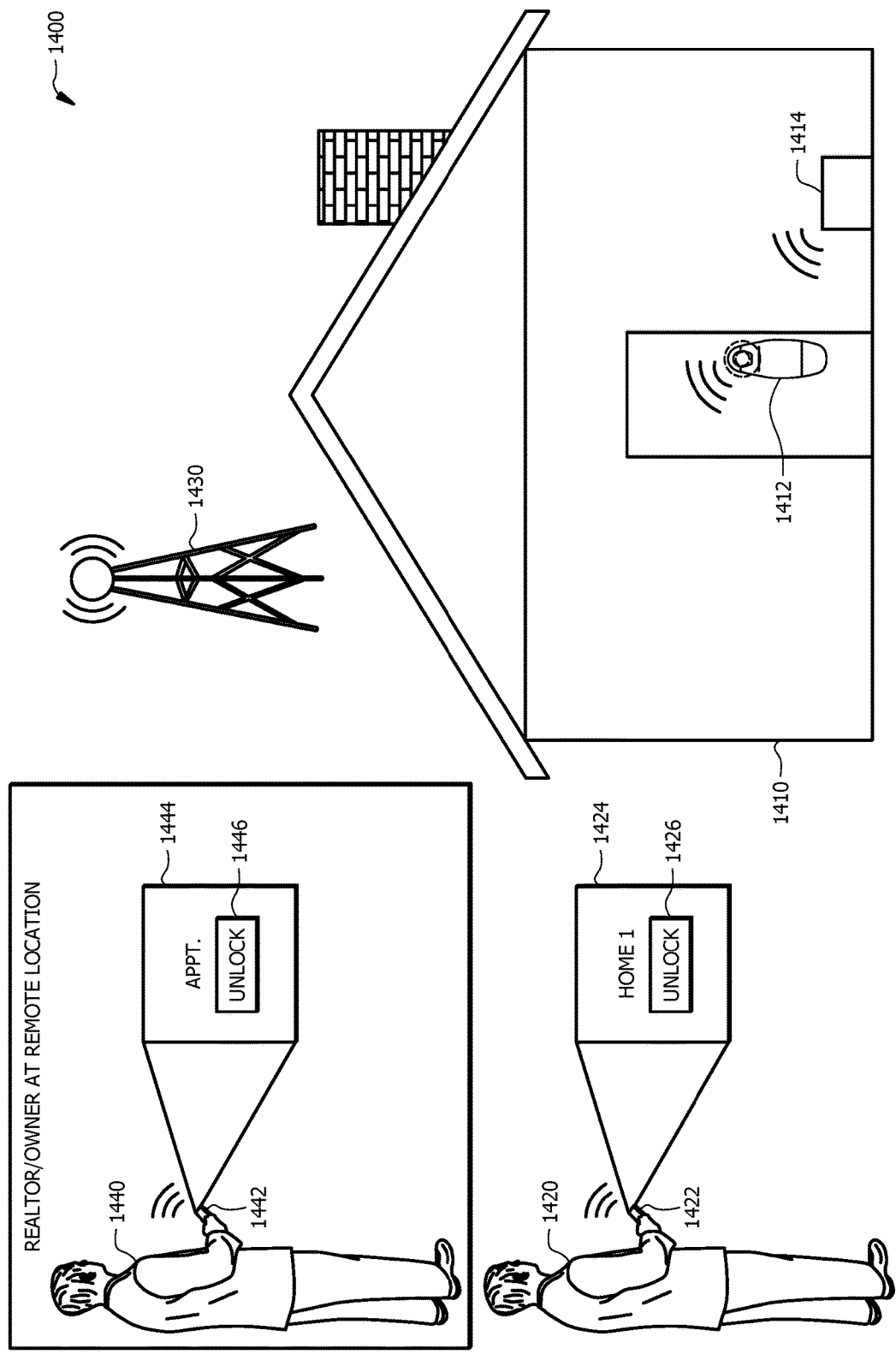
FIG. 14 is a diagram of a system embodiment under the present disclosure.

FIG. 14 displays an embodiment of a system under the present disclosure wherein a potential buyer 1420 approaches a house 1410 for a pre-approved tour. Buyer 1420 can approach the house at then pre-approved appointment time. The buyer's mobile device 1422 can be equipped with both cellular and Bluetooth functionality. The wireless lockbox 1412 can be equipped with cellular and Bluetooth functionality (and option Wi-Fi functionality). When the buyer approaches the house he will open the appropriate application on the mobile device 1422 and see interface 1424. The buyer may need to power on the wireless lockbox 1412 (or the wireless lockbox 1412 may already be powered on). Powering on the wireless lockbox 1412 can require flipping a switch or pressing down on a button, or in some embodiments the wireless lockbox 1412 can be woken via a wireless signal. The user can then select unlock function 1426 from the wireless device 1422. LED lights or a screen can indicate the status (on/off/transmitting/etc) of the wireless lockbox 1412. Selecting unlock 1426 will use the mobile device 1422 Bluetooth chip to convey a Bluetooth communication to wireless lockbox 1412 commanding to the wireless lockbox 1412 to open and provide the house key. The buyer 1420 can then enter the house, view the house, and then return the key to the wireless lockbox 1412. The buyer 1420 can then select a lock function from the application and the wireless lockbox 1412 will close and lock the key inside. In most embodiments, the buyer's mobile device 1422 will only be able to unlock the wireless lockbox 1412 during the pre-approved time slot. Remote servers, such as servers 560, or the owner's wireless device 1442, communicate with wireless lockbox 1412 to set the appointed time slot for buyer 1420. Only during that pre-approved time slot will buyer 1420 be able to unlock the wireless lockbox 1412.

Wireless lockbox 1412 comprises Bluetooth functionality to communicate with buyer wireless device 1422 but also comprises cellular functionality to communicate with owner wireless device 1442. Some embodiments will also comprise Wi-Fi functionality in the wireless lockbox 1412 to communicate with a wireless router 1414. Servers 560 and/or owner wireless device 1442 (or other computing devices as desired) can therefore manage the wireless lockbox 1412 remotely. Commands can be sent to the wireless lockbox 1412 from the owner or from the servers 560. Software updates can also be sent via cellular network 1430 or wireless router 1414.

As shown in FIG. 14, there may be situations where the buyer's wireless device 1422 fails to open the wireless lockbox 1412. This may be a software or hardware problem or other issue. In such situations, the system can allow the buyer 1420 to notify the owner 1440 (via text, email, phone call or other method) that the wireless lockbox 1412 will not open. The owner 1440 can then use his wireless device 1442, access the application interface 1444 and select an unlock function 1446. This can send a command via cellular and/or Wi-Fi to the unlock the wireless lockbox 1412. Similar functionality may be added whereby the system manager, managing servers 560, can send an unlock signal to the wireless lockbox 1412.

When a buyer 1420 has finished touring house 1410, he will put the key back in the wireless lockbox 1412, and press a lock command/button on the wireless device 1422/interface 1424. The wireless lockbox 1412 can ascertain whether the key is within the lockbox. If the key is not returned to the wireless lockbox 1412 within the pre-approved time slot, the owner 1440 or servers 560 can be notified. This serves as an anti-theft functionality. If a key is stolen, the servers 560 and/or owner 1440 can determine the last approved visit and the responsible user.

FIG. 14 has been described with a potential buyer 1420 and an owner 1440. However, in certain situations or embodiments either or both persons may be realtors or other individuals.

As shown in FIG. 4, the wireless lockbox can comprise a micro USB connection 450. Other embodiments may use a USB port or other means of charging or otherwise connecting the wireless lockbox to another computing device. The micro USB connection can be used to charge the device. It may also be used to connect the wireless lockbox to a computer to download/upload information, update software, or for other uses. Alternatively, the wireless lockbox can connect to computers or other computing devices via Wi-Fi, Bluetooth, or other wireless means. Furthermore, some embodiments may comprise wireless charging capabilities. If a wireless lockbox can charge wirelessly, and if updates and other connections can be made wirelessly, then a micro USB or USB connection may not be necessary.

Drawer motor 435, in FIG. 4, can comprise any type of actuator or other mechanism for opening a tray containing the house key. The opening mechanism could be electromechanical, magnetic, fluid-based, or another system. Relatedly, the key door sensor 445 can comprise any type of sensor for detecting when the key tray is closed or open. This part can also be optional.

The on/off switch 425 of FIG. 4 can comprise a variety of different power mechanisms. In a preferred embodiment on/off switch 425 can comprise a pressure sensitive switch under the LED lights 320 of FIG. 3A. LED lights 320, 430 can be arranged in a variety of patterns and/or colors. For example, a user may press down on switch 320 to power on the wireless lockbox 300. The LED lights may then turn a certain color, such as green. During unlocking processes the LED lights may turn orange or rotate among a chosen series of colors. Turning a wireless lockbox off may cause the lights to turn red and then power down. LED lights 320, 430 may also be used to notify users when the battery is low.

The users of the teachings disclosed herein may need to use an application or software package to participate in the systems and methods described. Certain software may be needed on various computing devices of FIG. 5, such as servers 560, computers 570, 575, and mobile devices 520, 530, and 540. Software can be downloaded and installed from the Internet, from a flash drive or other mechanism. Applications for mobile devices such as smartphones or tablets can be downloaded and installed from an application store or other mechanism.

Servers 560 of FIG. 5 can comprise a plurality of servers and/or computers. Servers 560 can store real estate listings from users of the system (owners and realtors creating real estate listings) and can also pull in other real estate listings from other resources. Servers 560 can also store data associating various wireless lockboxes with the respective owner and/or realtor. Servers 560 can therefore store user information for owners, realtors, and buyers. Servers 560 can also store information and functionality allowing certain users to control wireless lockboxes and send open, lock, and other commands. In some embodiments, servers 560 can comprise connections to financial institutions for various functionality such as sending and receiving information related to credit checks, or home loan information. For instance, in some embodiments a home owner may only allow home visits from potential buyers with a credit score of 700, or some other criteria.

To track and manage wireless lockboxes, servers 560 may assign an identification number to each wireless lockbox. When a user activates a wireless lockbox the servers 560 can associate the identification number to the user. The identification number can be matched with various identification numbers used by wireless networks and telecommunication networks. For instance, a wireless lockbox's identification number/name may be associated with a MAC number, IMEI number, IP address or other value. Servers 560 can also comprise, or access at another location, directions for sending messages to a wireless lockbox depending on what network the lockbox is on (such as a given cellular network).

When a user sends a command to a wireless lockbox, such as in FIG. 5, the command may, in some embodiments, go to servers 560 and then to the wireless lockbox 510. Alternatively, a command from a user, owner 540 for example, may be directed directly to wireless lockbox 510 over cellular network 590. A copy of the command may also be sent to servers 560 to be recorded. Some embodiments may utilize a Wi-Fi network at house 515 to communicate with wireless lockbox 510. A Wi-Fi network may be used in lieu of a cellular network or as a backup network to a cellular network.

Referring to FIG. 14, during a pre-approved time slot the buyer 1420 will be able to use the wireless device 1422 to unlock the wireless lockbox 1412. In most embodiments this will be done by the wireless device 1422 communicating with the wireless lockbox 1412 via Bluetooth. The communication can comprise an unlock code. The unlock code can comprise a unique code/signal for each wireless lockbox that is set ahead of time and never changes. Alternatively, the unlock code can comprise a continuously changing code that is updated by servers 560 in FIG. 5. Other embodiments may change the code at various intervals, or the code may be determined by time of day, week, or other settings. The code can comprise encryption (beyond normal Bluetooth or other wireless protocol encryption) such that only the associated software on the wireless device and wireless lockbox can decrypt it. The encryption can comprise PGP encryption, public key encryption, random number generation, hash functions, or other types of encryption protocols.

As shown in FIG. 2, a preferred embodiment of the wireless lockbox 200 can comprise an arm 240 for attachment to a door knob. The arm can be locked and unlocked by the microprocessor controlling the wireless lockbox. The arm can be unlocked remotely by servers 560 or the owner's mobile device or other computing device. Attaching and locking mechanisms can differ among different embodiments.

Wireless lockboxes as described herein can comprise a plurality of tamper sensors. Accelerometers, piezoelectric sensors, proximity sensors, temperature sensors, GPS interfaces, and other types of sensors can be used. The tamper sensor can be coupled to the microprocessor such that the wireless lockbox can report on its security status to the servers 560 or to the owner's mobile device or other computing device. Tamper sensors can include sensors within the wireless lockbox. Alternatively, a separate sensor can detect when a wireless lockbox has been removed a certain distance from the home owner's property.

Embodiments of the invention can comprise a charger for power supply 465 (of FIG. 4). Power supply 465 may be replaceable, such as a lithium-ion battery that can be swapped out and recharged. Alternatively, the battery may be non-removable and the user may have to dock the entire wireless lockbox in a charging station. Micro USB 450 can be used to charge the power supply 465.

Figure 18:
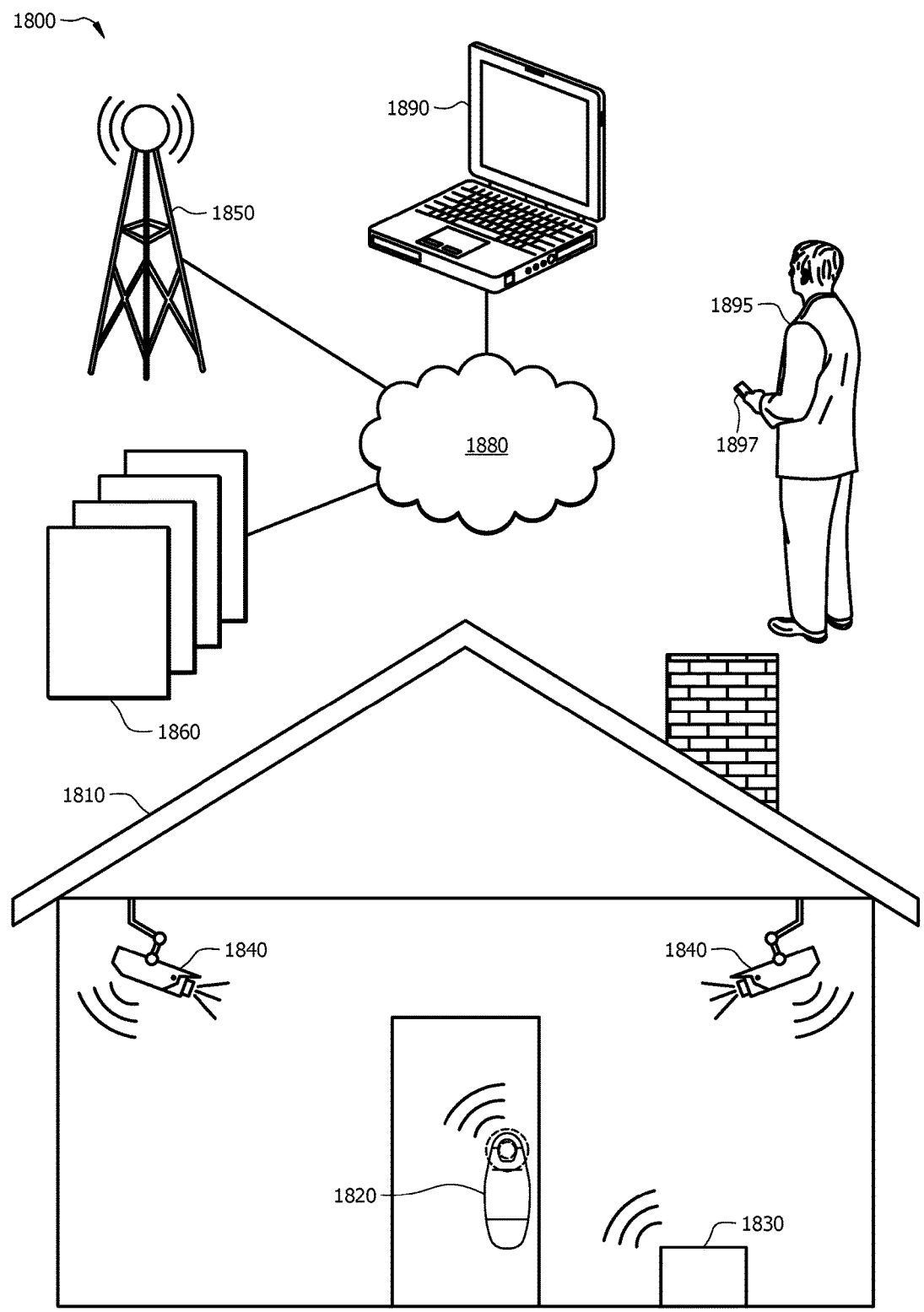
FIG. 18 is a diagram of a system embodiment under the present disclosure.

Embodiments of the invention can also comprise a security camera. The camera can be placed at the home seller's desired location. Similar to the lockbox and security key, the camera can have a wireless connection, allowing the seller to access and view a video feed from a remote location. This can give the seller added capabilities regarding security when selling a home. FIG. 18 displays an embodiment under the present disclosure including security cameras. System 1800 includes a wireless lockbox 1820 at a house 1810.

Inside the house the owner may place a plurality of security cameras 1840. The security cameras can be placed wherever the owner desires (resting on tables, hung from the ceiling, etc.) and the cameras can comprise wireless or wired connections to other components. As shown, a Wi-Fi router 1830 can communicate with wireless lockbox 1820 and security cameras 1840. A hard drive can be provided locally to stored video (not shown) or video can be uploaded to servers 1860 (which can comprise servers 560 of FIG. 5. An owner 1895 can use his mobile device 1897 to access a video stream of security cameras 1840. The owner can also access a video stream from a computer 1890. The video stream provided to the owner 1895 can be a direct communication from wireless router 1830, or wireless router 1830 can provide the video to servers 1860 which then send the video to the owner 1895. Cellular 1850 and network 1880 (such as the internet) can provide communication between various components. In other embodiments the security cameras 1840 can comprise a plurality of communication interfaces, both wired and wireless, to assist in providing video to users.

Figure 15:
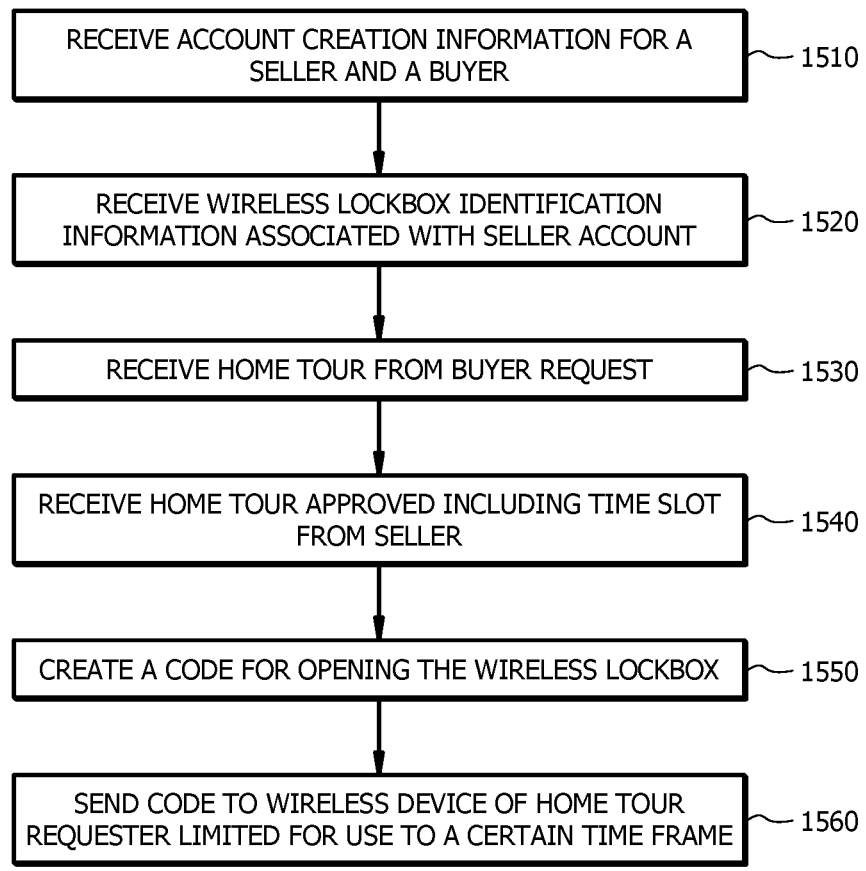
FIG. 15 is a flow-chart diagram of a method embodiment under the present disclosure.
Figure 16:
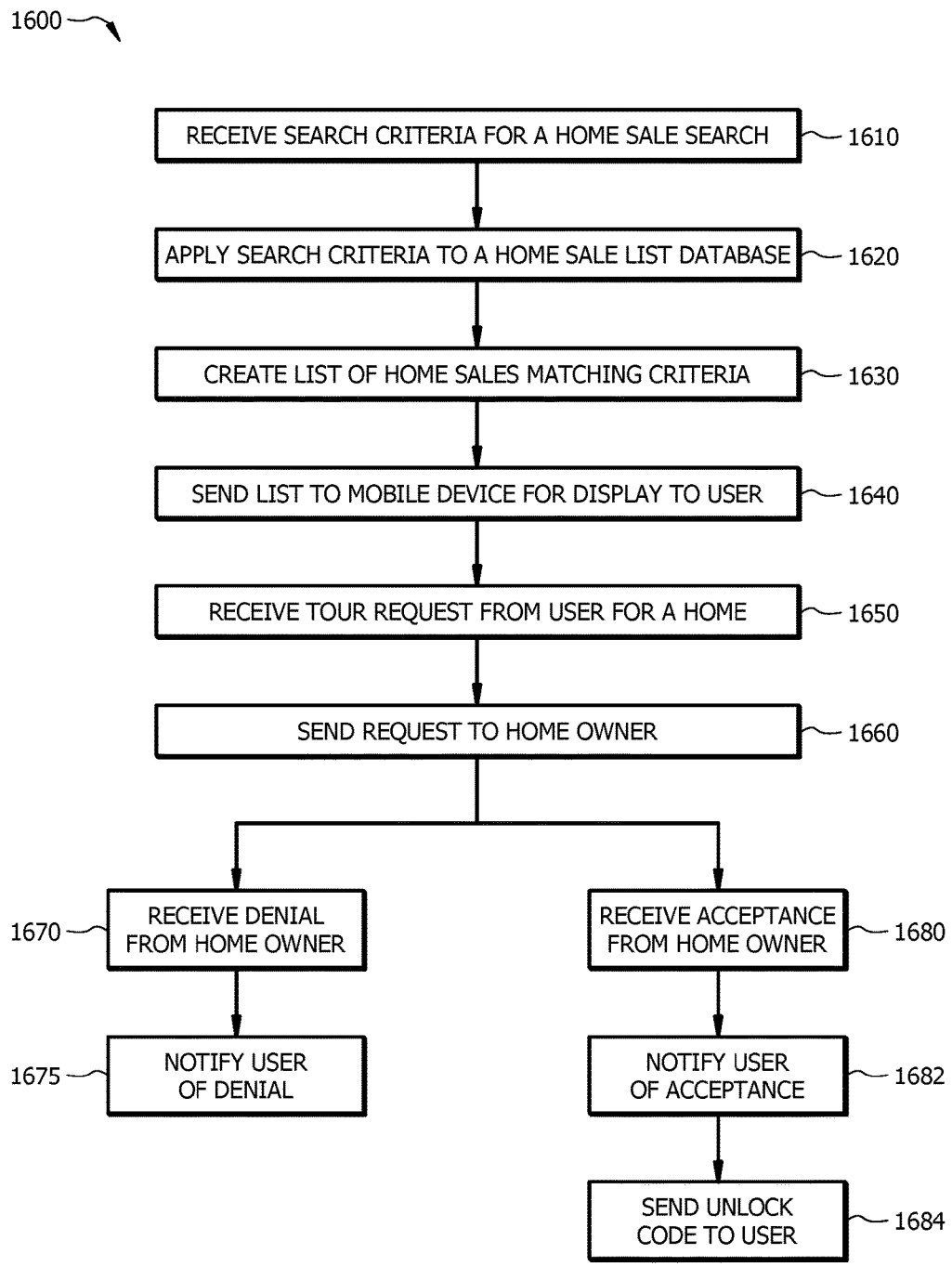
FIG. 16 is a flow-chart diagram of a method embodiment under the present disclosure.
Figure 17:
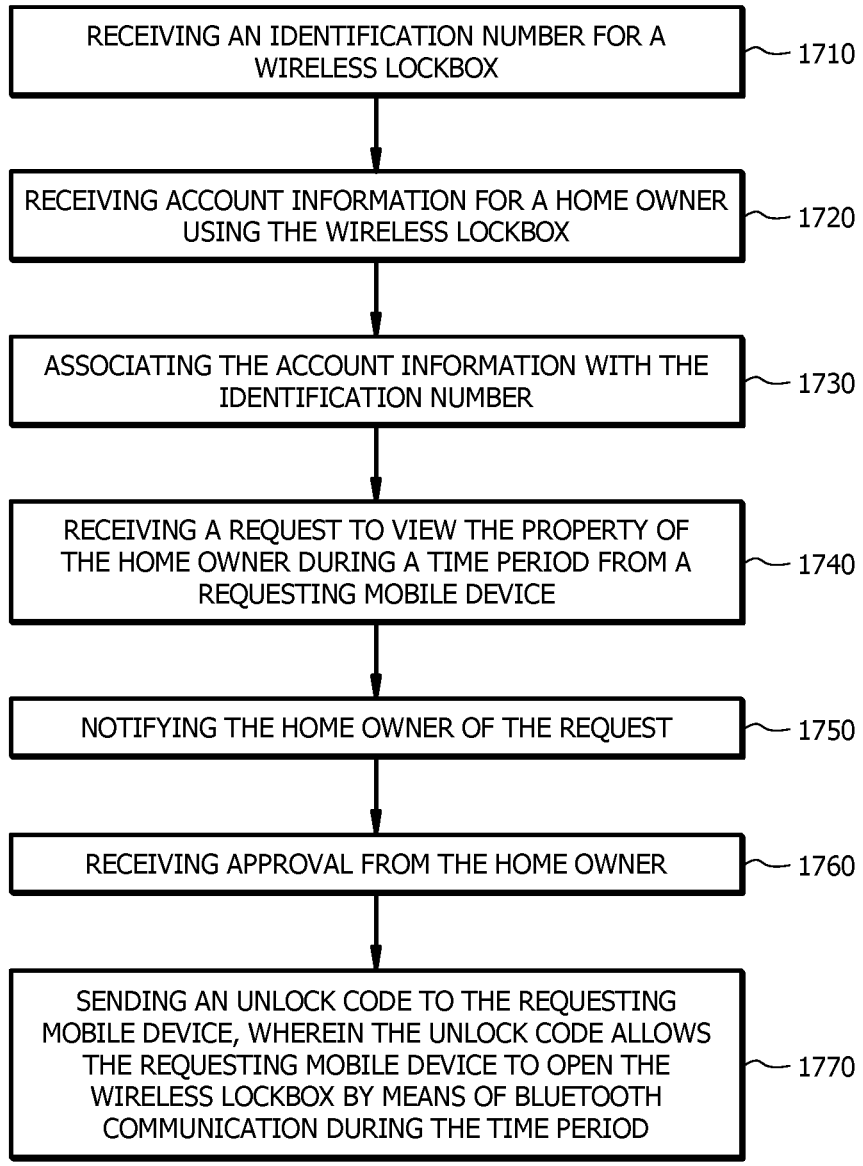
FIG. 17 is a flow-chart diagram of a method embodiment under the present disclosure.

FIGS. 15-17 display embodiments of methods under the present disclosure. In a preferred embodiment these methods can be carried out by a plurality of servers. Other arrangements of computers or devices can perform the processes described.

FIG. 15 displays a method embodiment under the present disclosure. Account creation formation for both a seller and a potential buyer can be received 1510. Then, wireless lockbox identification information can be associated with the seller account 1520. Then, a request to tour a home can be received from a potential buyer 1530. Approval of the request can be received 1540. After approval, an unlock code can be created to open the wireless lockbox 1550. The code can be sent to the wireless device of the home tour requester, wherein the code is limited to use during a certain time frame 1560.

FIG. 16 displays another embodiment of a method under the present disclosure. Search criteria can be received regarding a search for homes for sale 1610. The search criteria can be applied to a home sale list database 1620. A list of matching homes can be created 1630. The list can be sent to a mobile device for display to a user 1640. A tour request can be received from the user's mobile device 1650. The request can be sent to the home owner 1660. If the home owner rejects the request, the rejection can be received 1670 and the user can be notified 1675. Alternatively, the home owner may accept, their acceptance can be received 1680. The user can be notified 1682. An unlock code for a wireless lockbox can be sent to the user/wireless device 1684.

FIG. 17 displays another embodiment of a method under the present disclosure. An identification number of a wireless lockbox can be received 1710. Account information for a home owner using the wireless lockbox can be received 1720. The account information can be associated with the identification number 1730. A request to view the property of the home owner during a time period can be received from a requesting mobile device 1740. Approval of the request can be received 1760. An unlock code to the wireless lockbox can be sent to the requesting mobile device 1770. In most embodiments, the unlock code will only be functional during the time period agreed to by the home owner.

Further embodiments under the present disclosure can provide for a rating system of properties and/or realtors. Users, under their account screen on an application, can be presented with an interface for rating properties and/or realtors or agents. Rating can be done via a numerical system (e.g. on a scale of 1-4, or 0-10, etc) and/or with users leaving written feedback or reviews. Users may be able to rank properties or realtors or agents according to various criteria such as location, friendliness, cleanliness, etc. Ratings can be stored, maintained, received and sent via a plurality of servers, such as servers 560 in FIG. 5.

Another embodiment of the present disclosure can allow sellers to receive bids and offers for their house via their mobile device. Each side to a negotiation can submit bids and counter-offers, edit listing prices and make other edits to a listing or profile. Users can send each other questions and messages and send responses. Users may also be able to accept and sign contracts using the application provided. Offers, bids, counter offers, messages, and signed contracts can be stored, maintained, received and sent via a plurality of servers such as servers 560 in FIG. 5.

Further embodiments under the present disclosure can provide for removable skins for wireless lockboxes. Removable skins can comprise a variety of materials such as silicone, polyester, rubber or other appropriate materials. Removable skins can comprise separate portions for a main body portion and a locking tray portion of the wireless lockbox. Removable skins can also comprise a single piece.

Further embodiments of the present disclosure can comprise information beacons located throughout a house that is being sold or toured by potential buyers. The beacons can be wirelessly enabled, preferably Bluetooth, though other wireless standards are possible as well. As an agent/buyer tours a house, the beacons can detect their presence and send information to the agent or buyer's mobile device. For example, a beacon in the kitchen can send a message to a realtor's mobile device advising the realtor that the kitchen was remodeled in 2012, with professional grade appliances. A beacon at the front door can advise a buyer that the house was built in 1986 and has three bedrooms and three baths. A beacon near the back door can provide information regarding the back yard and fence. A single house can contain multiple beacons located at various positions. In some embodiments, the beacons and the wireless lockbox can all communicate with each other. Each beacon can comprise a microprocessor, a memory, a hard drive, a plurality of wireless interfaces, a power supply and other components. In a Bluetooth embodiment, the beacons can search for nearby devices with Bluetooth, and when nearby, send the device a message containing house information. The beacons can be able to communicate with the wireless lockbox or the servers 560 in FIG. 5, to know how to connect to the nearby mobile device(s).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of managing a wireless lockbox comprising:
receiving an identification number for a wireless lockbox;
receiving account information for a home owner using the wireless lockbox;
associating the account information with the identification number;
receiving a request to view a property of the home owner during a time period from a requesting mobile device;
notifying the home owner of the request;
receiving approval from the home owner;
sending an unlock code to the requesting mobile device, wherein the unlock code allows the requesting mobile device to open the wireless lockbox by means of wireless communication during the time period; and
receiving a notification that a key stored in the wireless lockbox has moved outside a predetermined proximity to the wireless lockbox if a key sensor detects that the key has moved outside the predetermined proximity.

2. The method of claim 1 further comprising receiving a notification that the requesting mobile device has opened the wireless lockbox.

3. The method of claim 1 further comprising receiving a notification that the key sensor has detected that the key has been removed from the wireless lockbox.

4. The method of claim 1 further comprising sending a notification to the home owner that the key has moved outside the predetermined proximity to the wireless lockbox.

5. The method of claim 1 wherein the requesting mobile device is a smartphone.

6. The method of claim 1 further comprising receiving a notification from the wireless lockbox that the key has been returned and that the wireless lockbox is locked.

* * * * *